(12) United States Patent
Pilard

(10) Patent No.: US 8,462,604 B2
(45) Date of Patent: Jun. 11, 2013

(54) METHOD AND APPARATUS FOR READING FROM AND/OR WRITING TO AN OPTICAL RECORDING MEDIUM

(75) Inventor: Gael Pilard, Reutlingen (DE)

(73) Assignee: Thomson Licensing, LLC, Princeton, NJ (US)

( * ) Notice: Subject to any disclaimer, the term of this patent is extended or adjusted under 35 U.S.C. 154(b) by 0 days.

(21) Appl. No.: 13/514,278

(22) PCT Filed: Nov. 19, 2010

(86) PCT No.: PCT/EP2010/067839
§ 371 (c)(1),
(2), (4) Date: Jun. 6, 2012

(87) PCT Pub. No.: WO2011/069809
PCT Pub. Date: Jun. 16, 2011

(65) Prior Publication Data
US 2012/0250486 A1   Oct. 4, 2012

(30) Foreign Application Priority Data

Dec. 7, 2009  (EP) .................................... 09306188

(51) Int. Cl.
*G11B 7/00* (2006.01)

(52) U.S. Cl.
USPC .. 369/116; 369/275.3; 369/47.5; 369/109.01; 369/112.24

(58) Field of Classification Search
None
See application file for complete search history.

(56) References Cited

U.S. PATENT DOCUMENTS

| 5,526,338 | A | 6/1996 | Hasman et al. |
| 5,537,382 | A * | 7/1996 | McLaughlin et al. ..... 369/59.24 |
| 5,825,742 | A * | 10/1998 | Tanaka et al. .............. 369/59.11 |
| 6,403,148 | B1 * | 6/2002 | Shiratori et al. .............. 427/128 |
| 2006/0104172 | A1 | 5/2006 | Van De Grampel et al. |
| 2007/0081443 | A1 * | 4/2007 | Kikukawa et al. ............ 369/126 |
| 2007/0195673 | A1 * | 8/2007 | Kobayashi et al. ........ 369/59.11 |
| 2007/0247997 | A1 | 10/2007 | Yanagawa et al. |
| 2008/0279082 | A1 | 11/2008 | Shin |
| 2008/0291810 | A1 * | 11/2008 | Alpert et al. ................ 369/275.3 |
| 2009/0034391 | A1 * | 2/2009 | Aoki et al. ..................... 369/100 |
| 2010/0008206 | A1 * | 1/2010 | Jeong ............................ 369/103 |
| 2010/0232268 | A1 * | 9/2010 | Shintani et al. .............. 369/47.5 |
| 2011/0058460 | A1 * | 3/2011 | Yamamoto et al. .......... 369/47.5 |

FOREIGN PATENT DOCUMENTS

| EP | 0372365 | 8/1990 |
| JP | 2007048404 | 2/2007 |

OTHER PUBLICATIONS

Search Rept: Dec. 22, 2010.

* cited by examiner

*Primary Examiner* — Van Chow
(74) *Attorney, Agent, or Firm* — International IP Law Group, LLP

(57) ABSTRACT

A method and an apparatus for reading data from or writing data to an optical recording medium is described, the data being stored as marks having different lengths. Marks having a length below the limit of diffraction at a first wavelength are read or written with the first wavelength, whereas marks having a length above the limit of diffraction at the first wavelength are read or written with a second wavelength larger than the first wavelength.

18 Claims, 3 Drawing Sheets

Figure 1:
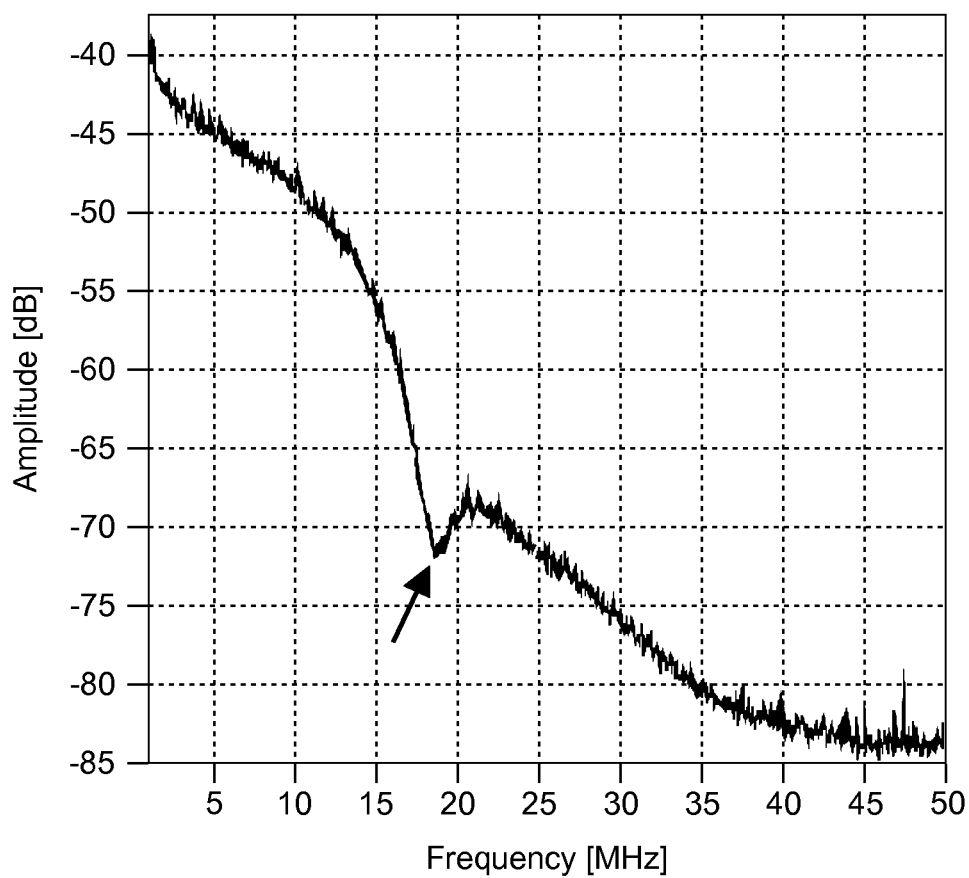

METHOD AND APPARATUS FOR READING FROM AND/OR WRITING TO AN OPTICAL RECORDING MEDIUM

This application claims the benefit, under 35 U.S.C. §365 of International Application PCT/EP2010/067839, filed Nov. 19, 2010, which was published in accordance with PCT Article 21(2) on Jun. 16, 2011 in English and which claims the benefit of European patent application No. 09306188.5, filed Dec. 7, 2009.

The present invention relates to a method and an apparatus for reading from and/or writing to an optical recording medium, and more specifically to a method and an apparatus for reading from and/or writing to an optical recording medium with a Super-RENS structure.

Numerous types of optical storage media and corresponding storage systems are known. For example, JP 2007-48404 discloses an optical recording medium, which includes a first recording layer (a BD-layer, BluRay Disc) capable of recording/reading with a first wavelength of a first laser beam and a second recording layer (a DVD-layer, Digital Versatile Disc) capable of recording/reading with a second wavelength of a second laser beam.

US 2006/0104172 discloses an optical recording medium, which has a CD format (Compact Disc), but which includes a test region with DVD-formatted marks. The optical recording medium is read at a CD wavelength, whereas the test region is read at a DVD wavelength.

US 2007/0247997 describes a hybrid DVD/CD optical recording medium and a hybrid BD/CD optical recording medium, which are recorded by simultaneously illuminating two light beams with different wavelengths. This is done to increase the irradiated amount of energy.

US 2008/0279082 discloses a multi-layer optical recording medium. The different layers are read with different wavelengths. A playback device for this optical recording medium includes a multi-wavelength light source, which is used for simultaneously illuminating all recording layers. The reflected light is split in accordance with the wavelength, which allows to retrieve the data recoded in the different layers.

Optical data storage is generally limited by the optical resolution of the read/write-system. Straightforward methods of increasing the optical resolution include using a shorter wavelength and a larger numerical aperture NA, at the costs of lens complexity. As an alternative a mask layer with a so-called super-resolution near field structure (Super-RENS) can be placed directly above a data layer of the optical recording medium, which significantly reduces the effective size of a light spot used for reading from and/or writing to the optical recording medium. Optical recording media with such a Super-RENS structure offer the possibility to increase the data density by a factor of 3 to 4 in one dimension compared to a regular optical recording medium. Today mainly two types of mask layers are used. Both show good carrier-to-noise ratio (CNR) results on single tone frequencies below the optical cut-off frequency. The first type is a phase change type, which makes use of materials like AgInSbTe (also known as AIST), GeSbTe (also known as GST) or SbTe. The second type is a semiconductor type, for example InSb, or any other material which induces an appreciable reflectivity change when a high read power laser passes through a land area. Super-RENS structures formed of a metal oxide or a polymer compound for recording of data and a phase change layer formed of a GeSbTe or a AgInSbTe based structure for reproducing of data are known from WO 2005/081242 and US 2004/0257968, respectively. A further example of a super-RENS structure is described in WO 2004/032123.

Typically data are coded using marks with different lengths. The basic principle of super-resolution is to use marks with a length below the limit of diffraction. Detection of those marks is enabled using the optical non-linearity of the super-RENS mask layer, which acts as a local probe when illuminated with a reading light beam having a higher read power than for conventional detection. The larger marks, however, have a length above the limit of diffraction and are detected by diffractive detection. It has been found that data detection and the retrieval of the signal suffer from the conflict between super-resolution detection of the small marks below the limit of diffraction and the diffractive detection of the large marks above the limit of diffraction. Similar effects occur for other optical recording media having marks with a size below the limit of diffraction as well as marks with a size above the limit of diffraction. A straightforward idea to circumvent the conflict between the two detection mechanisms is to use only marks with a length below the limit of diffraction. This, however, leads to a rather limited range of allowed mark sizes, which makes the coding harder and negatively impacts the data capacity.

It is an object of the invention to propose a solution for reading data from and/or writing data to an optical recording medium, the data being stored as marks with different lengths, which overcomes the above difficulties.

According to one aspect of the invention, this object is achieved by a method for reading data from an optical recording medium, the data being stored as marks having different lengths, which has the steps of:

illuminating the marks with a light beam of a first wavelength and a light beam of a second wavelength larger than the first wavelength;

detecting a first reflected light beam of the first wavelength and a second reflected light beam of the second wavelength;

detecting the marks having a length below the limit of diffraction at the first wavelength from the first detected reflected light beam; and detecting the marks having a length above the limit of diffraction at the first wavelength from the second detected reflected light beam.

Similarly, this object is also achieved by a method for writing data to an optical recording medium as marks having different lengths, which has the steps of:

writing the marks having a length below the limit of diffraction at the first wavelength with a light beam of a first wavelength; and writing the marks having a length above the limit of diffraction at the first wavelength with a light beam of a second wavelength larger than the first wavelength.

According to another aspect of the invention, this object is achieved by an apparatus for reading from an optical recording medium on which data are stored as marks having different lengths, with a first light source for generating a light beam of a first wavelength and a second light source for generating a light beam of a second wavelength larger than the first wavelength, and with one or more detectors for detecting a first light beam of the first wavelength reflected from the optical recording medium and a second light beam of the second wavelength reflected from the optical recording medium, which has an evaluation circuitry adapted to detect the marks having a length below the limit of diffraction at the first wavelength from the first detected reflected light beam and to detect the marks having a length above the limit of diffraction at the first wavelength from the second detected reflected light beam.

Likewise, this object is achieved by an apparatus for writing data to an optical recording medium as marks having different lengths, with a first light source for generating a light beam of a first wavelength and a second light source for generating a light beam of a second wavelength larger than the first wavelength, which is adapted to write the marks having a length below the limit of diffraction at the first wavelength with the light beam of the first wavelength and to write the marks having a length above the limit of diffraction at the first wavelength with the light beam of the second wavelength.

A main idea of the present invention is to use at least two different laser wavelengths for reading and/or writing marks.

This allows to read and/or write all marks in the super-resolution regime. Consequently, the range of available of mark lengths is increased. The mark length for changing from the first wavelength to the second wavelength is defined by the limit of diffraction at the first wavelength. During writing the short marks are written using the shorter wavelength, whereas the longer marks are written using the longer wavelength. A further alternative is to 'prepare' the recording material with a constant power delivered by the second light source at the longer wavelength and to write the marks using additional pulses delivered by the first light source at the shorter wavelength.

Advantageously, the first wavelength is around 405 nm, the second wavelength is around 780 nm. These are the wavelengths used for BD (BluRay Disk) and CD (Compact Disk), respectively. Hence, inexpensive and reliable light sources are available, as well as the necessary optical components. For a conventional BluRay disk pickup with a blue light source at a wavelength of $\lambda$=405 nm and a numerical aperture NA=0.85, the limit of diffraction is LD=238.23 nm for the smallest detectable structure. As this structure consists of a mark plus a space, the largest mark length below the limit of diffraction is roughly 120 nm. Consequently, the predetermined length for changing from the first wavelength to the second wavelength is around 120 nm.

Preferably, the light beam with the second wavelength is slightly defocused with a collimator lens. A certain amount of chromatic aberration will generally be introduced by an objective lens that focuses the different light beams onto the optical recording medium, which leads to different foci of the light beams. This can easily be compensated by a slight defocus of the light beam with the longer wavelength.

Favorably, the light beam of the first wavelength and the light beam of the second wavelength are illuminated onto different locations of the optical recording medium. This allows to provide fully separate signal paths for the different light beams. However, during reading the resulting time shift of the detector signals needs to be taken into account by an evaluation circuitry.

Advantageously, the first reflected light beam and the second reflected light beam are detected with a single detector. This allows to simplify the detection path, as it is not necessary to separate the different reading wavelengths. Consequently, the cost of the detection path is reduced. Preferably, one of the light sources is high frequency modulated to enable a reliable signal separation.

Figure 2:
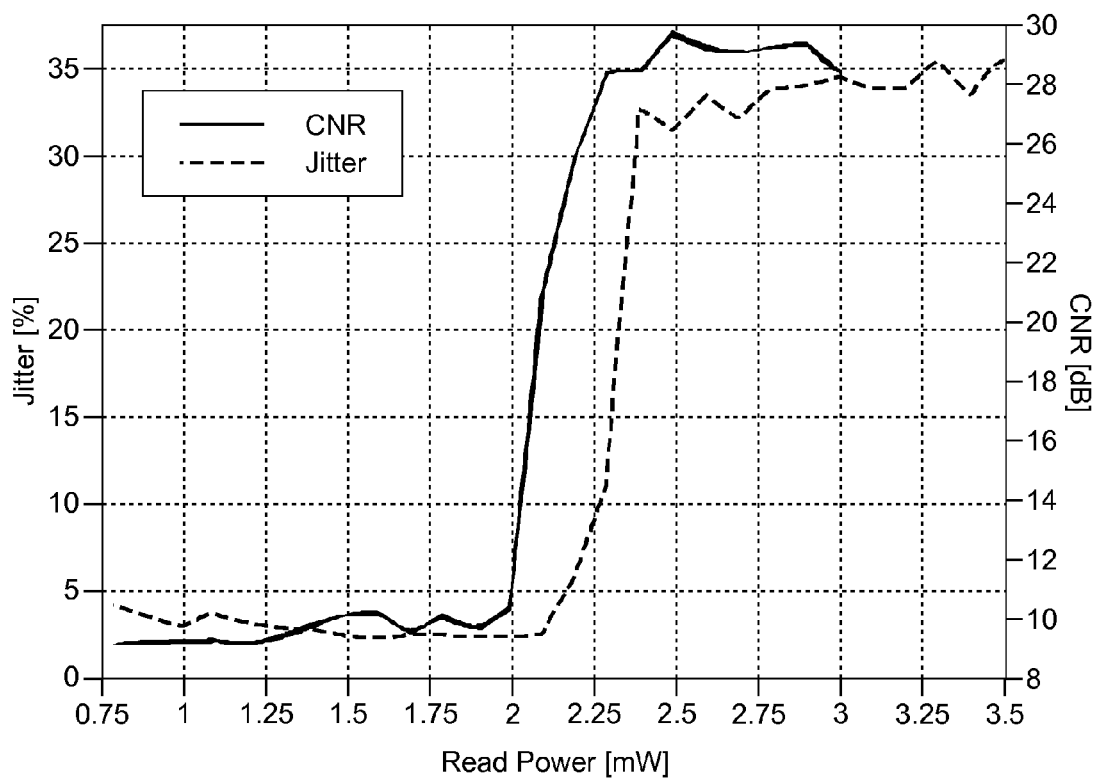
Figure 3:
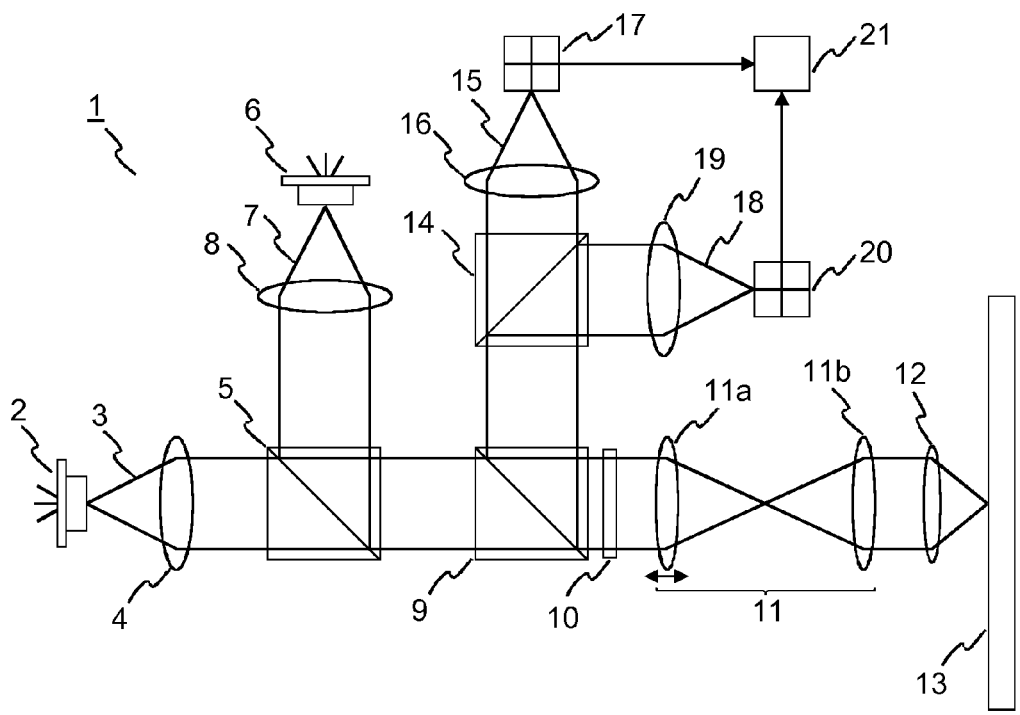
Figure 4:
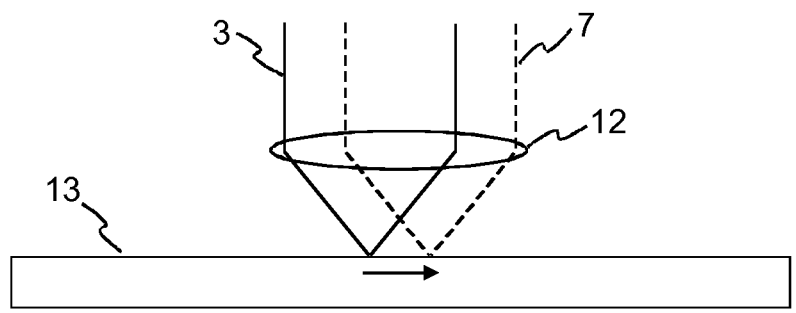
Figure 5:
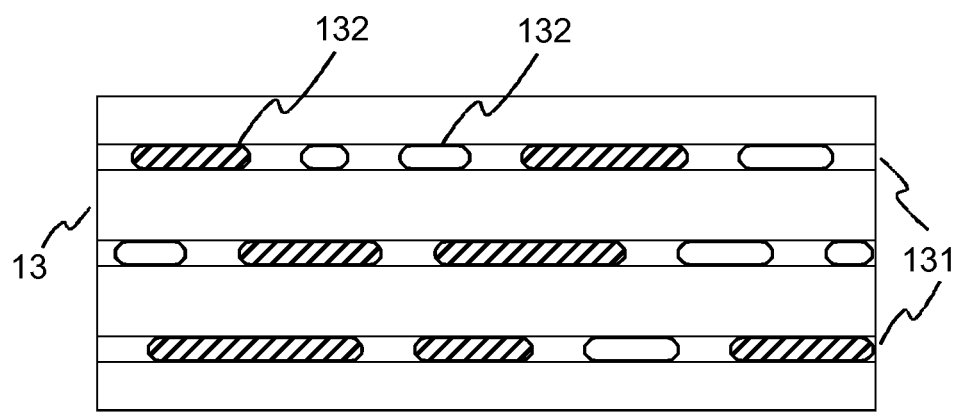

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

FIG. 1 illustrates a spectrum of an AIST-based super-RENS optical recording medium, FIG. 2 shows results of CNR and jitter measurements in dependence of the read power, FIG. 3 depicts an apparatus according to the invention for reading from and/or writing to a Super-RENS optical recording medium, FIG. 4 shows the arrangement of a first and a second reading light beam relative to the optical recording medium, and FIG. 5 depicts a series of tracks on a Super-RENS optical recording medium, in which data are recorded as marks.

FIG. 1 illustrates a spectrum of an AIST-based super-RENS optical recording medium. Plotted is the amplitude of the detected signal in dB against the frequency of the marks in MHz, i.e. against the reciprocal of the length of one mark plus one space multiplied by the reading speed, which in this example is 4.92 m/s. As can be seen, there is a dip (indicated by the arrow) in the spectrum between the regime of diffractive detection on the left side and the regime of super-resolution detection on the right side. This dip results from the conflict between super-resolution detection and diffractive detection and constitutes a problem for data readout.

Furthermore, CNR and jitter measurements performed on a super-resolution optical recording medium with an AIST mask layer have revealed a further problem. FIG. 2 shows the results of those measurements. The continuous line represents the CNR in dB against the read power of a reading light beam in mW for a mark length of 80 nm. The dashed line represents the measured jitter in % against the read power in mW determined for the longer marks, i.e. in the regime of diffractive detection. As can be seen, satisfactory CNR values in the super-resolution detection regime are achieved with a read power above 2.25 mW. However, such a read power results in a poor signal in the regime of diffractive detection, as the jitter assumes very large values.

FIG. 3 depicts an apparatus 1 according to the invention for reading from and/or writing to a Super-RENS optical recording medium 13, which overcomes the above described problems. A first laser diode 2 emits a polarized reading light beam 3 at a first wavelength, e.g. at 405 nm, which is collimated by a first collimator lens 4. A second laser diode 6 emits a polarized reading light beam 7 at a second wavelength, e.g. at 780 nm, which is collimated by a second collimator lens 8. Both laser diodes 2, 6 are used for super-resolution detection. Therefore, they both need to operate in a power-range that enables super-resolution mechanisms. The two collimated light beams 3, 7 are combined by a first dichroic beam splitter 5 and pass through a polarizing beam splitter 9. A subsequent quarter wave plate 10 transforms the two light beams 3, 7 into circular polarized light beams 3, 7, which then pass through a telescope 11 consisting of two lenses 11a, 11b. An objective lens 12 focuses the two light beams 3, 7 onto the optical recording medium 13. A certain amount of chromatic aberration will generally be introduced by the objective lens 12, which leads to different foci of the two light beams 3, 7. This can easily be compensated by a slight defocus of the light beam 7 with the longer wavelength. Alternatively, a specifically designed objective lens 12 may be used, which is corrected for the chromatic aberration between the two wavelengths. The light beams 15, 18 reflected by the optical recording medium 13 are collimated by the objective lens 12 and pass through the quarter wave plate 10, which transforms the reflected light beams 15, 18 into linear polarized light beams 15, 18. Due to the quarter wave plate 10 the direction of polarization of the reflected light beams 15, 19 is perpendicular to the direction of polarization of the initial light beams 3, 7. The reflected light beams 15, 18 are thus deflected by the polarization beam splitter 9 towards a second dichroic beam splitter 14, which separates the optical paths of the two reflected light beams 15, 18. The first reflected light beam 15 is focused by a first focusing lens 16 onto a first photodetector 17. In this example, the first photodetector 17 has four detector quadrants. The second reflected light beam 18 is focused by a second focusing lens 19 onto a second photodetector 20 which in this example also has four detector quadrants. An evaluation circuitry (21) evaluates the signals obtained by the photodetectors 17, 20 to obtain focus and tracking signals as well as a data signal. In the figure, a dichroic beam splitter 14 is used for separating the optical paths. Of course, it is likewise possible to use other components for this purpose, e.g. a grating or a prism. In addition, it is feasible to use only a single detector for the detection of both wavelengths. In this case one of the laser diodes 2, 6 is preferably high frequency modulated to enable a reliable signal separation.

In FIG. 3 the two light beams 3, 7 are focused onto the same position of the optical recording medium 13. Of course, it is likewise possible to arrange both light beams 3, 7 slightly displaced in a track direction of the optical recording medium 13. This is schematically depicted in FIG. 14. In this case the evaluation circuitry needs to take the resulting time shift of the detector signals into account. Of course, it is likewise possible to provide largely or fully separate optical paths for the two light beams 3, 7. In addition, more than two reading wavelengths may be used.

A series of tracks 131 on a Super-RENS optical recording medium 13, in which data are recorded as marks 132, is depicted in FIG. 5. Illustrated is only a small section of the surface of the optical recording medium 13. In case of a disk-shaped, rotating optical recording medium 13, the tracks 131 are either arranged as concentric tracks or as a track spiral. In case of a card-shaped optical recording medium 13 the tracks 132 are preferably parallel tracks. As can be seen, data are coded using marks 132 with different lengths. Some marks 132 have a length larger than the limit of diffraction of the shorter wavelength. These marks 132 are illustrated as hashed marks. They are detected using the longer wavelength.

A main idea of the present invention is to use at least two different reading and/or writing wavelengths to implement an increased range of marks lengths while reading all marks in the super-resolution regime. The limit of diffraction is given by the formula $$LD=\lambda/(2\times NA),$$

where LD is the limit of diffraction, $\lambda$ is the wavelength used for detection, and NA denotes the numerical aperture of the objective lens 12.

For a conventional BluRay disk pickup with a blue laser 2 at a wavelength of $\lambda=405$ nm and a numerical aperture NA=0.85, the limit of diffraction is LD=238.23 nm for the smallest detectable structure. As this structure consists of a mark plus a space, the largest mark length below the limit of diffraction is roughly 120 nm.

When an additional infrared laser 6 at a wavelength of $\lambda=780$ nm is used, like the ones used for Compacts Disks, the corresponding limit of diffraction is reached for a mark length of 230 nm.

Data detection with the above described apparatus 1 is performed as follows. The smallest marks, which are below the limit of diffraction of the shorter wavelength, i.e. whose size is below 120 nm, are detected using this wavelength. The larger marks, which are in a range comprised between the limit of diffraction of the two wavelengths, i.e. whose size is between 120 nm and 230 nm, are detected using the longer wavelength.

The simultaneous detection using two wavelengths offers some advantageous possibilities for the signal analysis. For example, the signals from the different wavelengths may be coupled in order to enhance the detection or to recover or find errors. Alternatively, the diffractive readout signal stemming from the detection of the longer marks with the shorter wavelength may be removed using the fact that their amplitude is higher and/or that their frequency is lower.

During writing all marks may be written using the shorter wavelength. Alternatively, as during reading the short marks are written using the shorter wavelength, whereas the longer marks are written using the longer wavelength. A further alternative is to 'prepare' the recording material with a constant power delivered by the second laser diode 6 at the longer wavelength and to write the marks using additional pulses delivered by the first laser diode 2 at the shorter wavelength.

The proposed wavelengths allow to easily build an RLL (1,9) coding similar to the one used for the BluRay disk format. With a clock length T of 25 nm the following mark lengths are obtained:

| | |
|---|---|
| 2T = 50 nm | Detection at 405 nm using |
| 3T = 75 nm | super-resolution mechanisms |
| 4T = 100 nm | |
| 5T = 125 nm | Detection at 780 nm using |
| 6T = 150 nm | super-resolution mechanisms |
| 7T = 175 nm | |
| 8T = 200 nm | |

As can be seen, all marks from 50 nm to 200 nm are detected in the super-resolution regime. Of course, it is likewise possible to use different combinations of wavelengths to cover the desired range of mark lengths.

As indicated in the description of FIG. 3 a slight defocus of the light beam 7 with the longer wavelength is preferably used to compensate the chromatic aberration introduced by the objective lens 12. This is possible because the focal depth of this light beam 7 is more tolerant than the focal depth of the light beam 3 with the shorter wavelength. The focal depth $\Delta z$ of a light beam is given by $$\Delta z=0.8\times\lambda/NA^2.$$

For NA=0.85 and a wavelength $\lambda=405$ nm this yields $\Delta z=448$ nm, whereas for $\lambda=780$ nm the focal depth is $\Delta z=864$ nm.

The invention claimed is:

1. A method for reading data from an optical recording medium, the data being stored as marks having different lengths, the method comprising the steps of:
    illuminating the marks with a light beam of a first wavelength and a light beam of a second wavelength larger than the first wavelength with an objective lens;
    detecting a first reflected light beam of the first wavelength and a second reflected light beam of the second wavelength;
    detecting marks having a length below a limit of diffraction at the first wavelength from the detected first reflected light beam, wherein the limit of diffraction at the first wavelength is given by the first wavelength divided by twice a numerical aperture of the objective lens; and
    detecting marks having a length above the limit of diffraction at the first wavelength from the detected second reflected light beam.

2. The method according to claim 1, wherein the first wavelength is around 405 nm and the second wavelength is around 780 nm.

3. The method according to claim 1, further comprising the step of defocusing the light beam with the second wavelength with a collimator lens.

4. The method according to claim 1, wherein the light beam of the first wavelength and the light beam of the second wavelength are illuminated onto different locations of the optical recording medium.

5. The method according to claim 1, wherein the first reflected light beam and the second reflected light beam are detected with a single detector.

6. A method for writing data to an optical recording medium as marks having different lengths, the method comprising the steps of:
 writing marks having a length below a limit of diffraction at the first wavelength with a light beam of a first wavelength, wherein the limit of diffraction at the first wavelength is given by the first wavelength divided by twice a numerical aperture of an objective lens used for illuminating the light beam of the first wavelength onto the optical medium; and
 writing marks having a length above the limit of diffraction at the first wavelength with a light beam of a second wavelength larger than the first wavelength.

7. The method according to claim 6, wherein the first wavelength is around 405 nm and the second wavelength is around 780 nm.

8. The method according to claim 6, further comprising the step of defocusing the light beam with the second wavelength with a collimator lens.

9. The method according to claim 6, wherein the light beam of the first wavelength and the light beam of the second wavelength are illuminated onto different locations of the optical recording medium.

10. An apparatus for reading from an optical recording medium on which data are stored as marks having different lengths, with a first light source for generating a light beam of a first wavelength and a second light source for generating a light beam of a second wavelength larger than the first wavelength, an objective lens for illuminating the marks with the light beam of the first wavelength and the light beam of the second wavelength, an objective lens for illuminating the marks with the light beam of the first wavelength and the light beam of the second wavelength, and with one or more detectors for detecting a first light beam of the first wavelength reflected from the optical recording medium and a second light beam of the second wavelength reflected from the optical recording medium, wherein the apparatus comprises an evaluation circuitry adapted to detect marks having a length below a limit of diffraction at the first wavelength from the detected first detected reflected light beam, wherein the limit of diffraction at the first wavelength is given by the first wavelength divided by twice a numerical aperture of the objective lens, and to detect marks having a length above the limit of diffraction at the first wavelength from the detected second reflected light beam.

11. The apparatus according to claim 10, wherein the first wavelength is around 405 nm and the second wavelength is around 780 nm.

12. The apparatus according to claim 10, wherein a collimator lens is arranged in a defocus position for slightly defocusing the light beam with the second wavelength.

13. The apparatus according to claim 10, wherein the light beam of the first wavelength and the light beam of the second wavelength are illuminated onto different locations of the optical recording medium.

14. The apparatus according to claim 10, comprising a single detector for detecting the first reflected light beam and the second reflected light beam.

15. An apparatus for writing data to an optical recording medium as marks having different lengths, with a first light source for generating a light beam of a first wavelength, a second light source for generating a light beam of a second wavelength larger than the first wavelength, and with an objective lens for illuminating the light beam of the first wavelength and the light beam of the second wavelength onto the optical recording medium, wherein the apparatus is adapted to write marks having a length below a limit of diffraction at the first wavelength with the light beam of the first wavelength, wherein the limit of diffraction at the first wavelength is given by the first wavelength divided by twice a numerical aperture of the objective lens, and to write marks having a length above the limit of diffraction at the first wavelength with the light beam of the second wavelength.

16. The apparatus according to claim 15, wherein the first wavelength is around 405 nm and the second wavelength is around 780 nm.

17. The apparatus according to claim 15, wherein a collimator lens is arranged in a defocus position for slightly defocusing the light beam with the second wavelength.

18. The apparatus according to claim 15, wherein the light beam of the first wavelength and the light beam of the second wavelength are illuminated onto different locations of the optical recording medium.

\* \* \* \* \*